US012804446B2

(12) United States Patent
(10) Patent No.: US 12,804,446 B2
(45) Date of Patent: Nov. 17, 2026

Dasam et al.

(54) SYSTEMS FOR AND METHODS OF MULTILINK OPERATION USING BEACON RECEPTION PATTERNS

(71) Applicant: Avago Technologies International Sales Pte. Limited, Singapore (SG)

(72) Inventors: Somaraju Dasam, Bangalore (IN); Yogesh Bandaru, Bangalore (IN); Manoj Raveendranath Kamath, Bangalore (IN); Raghvendra Gupta, Bangalore (IN); Harish Vaidya, Bangalore (IN); Shivkumar Basavaraj Tadahal, Bangalore (IN); Rakesh Raman, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 292 days.

(21) Appl. No.: 18/425,820

(22) Filed: Jan. 29, 2024

(65) Prior Publication Data

US 2025/0247736 A1 Jul. 31, 2025

(51) Int. Cl.
*H04W 28/02* (2009.01)
*H04W 76/15* (2018.01)
*H04W 84/12* (2009.01)

(52) U.S. Cl.
CPC ....... *H04W 28/0221* (2013.01); *H04W 76/15* (2018.02); *H04W 84/12* (2013.01)

(58) Field of Classification Search
CPC .......................... H04W 76/15; H04W 28/0221
See application file for complete search history.

(56) References Cited

U.S. PATENT DOCUMENTS

| | | | | |
|---|---|---|---|---|
| 12,309,792 | B2 * | 5/2025 | Asterjadhi | H04W 72/23 |
| 2014/0064164 | A1 * | 3/2014 | Nagaraj | H04W 88/10 370/328 |
| 2018/0054088 | A1 * | 2/2018 | Zeine | H01Q 15/24 |
| 2018/0241254 | A1 * | 8/2018 | Elliott | H02J 50/23 |
| 2021/0212141 | A1 * | 7/2021 | Chu | H04L 45/24 |
| 2021/0250848 | A1 * | 8/2021 | Seok | H04W 48/16 |
| 2021/0282119 | A1 * | 9/2021 | Asterjadhi | H04W 72/23 |
| 2021/0385692 | A1 * | 12/2021 | Kwon | H04W 28/24 |
| 2022/0264429 | A1 * | 8/2022 | Gan | H04W 28/0221 |
| 2022/0337338 | A1 * | 10/2022 | Homchaudhuri | H04B 7/024 |
| 2023/0292225 | A1 * | 9/2023 | Ratnam | H04W 28/0263 |
| 2023/0327836 | A1 * | 10/2023 | Kim | H04L 5/0053 370/338 |
| 2023/0403647 | A1 * | 12/2023 | Kim | H04W 52/02 |
| 2023/0403753 | A1 * | 12/2023 | Huang | H04W 76/15 |
| 2024/0057158 | A1 * | 2/2024 | Dong | H04L 5/0078 |
| 2024/0089854 | A1 * | 3/2024 | Jia | H04W 52/0216 |
| 2024/0114346 | A1 * | 4/2024 | Patil | H04W 72/0453 |
| 2024/0137979 | A1 * | 4/2024 | Kim | H04L 5/0096 |

(Continued)

*Primary Examiner* — Fahmida S Chowdhury
(74) *Attorney, Agent, or Firm* — Foley & Lardner LLP

(57) ABSTRACT

Systems and methods use a protocol for multilink operations. The systems and methods can use a circuit configured to provide frames across a connection comprised of one or more links to a second device. The circuit is configured to use a beacon reception pattern where first intervals on a first link are alternately disposed with second intervals on a second link or to select a beacon reception pattern for a first link, a second link, and a third link in response a low battery condition, a delivery traffic indication map setting, or a roam decision.

19 Claims, 6 Drawing Sheets

(56) References Cited

U.S. PATENT DOCUMENTS

| | | | | |
|---|---|---|---|---|
| 2024/0163916 | A1* | 5/2024 | Ryu .................. | H04W 74/0866 |
| 2024/0224203 | A1* | 7/2024 | Dong .................. | H04W 56/001 |
| 2024/0276572 | A1* | 8/2024 | Dong .................... | H04W 76/15 |
| 2024/0406999 | A1* | 12/2024 | Bhattacharya .... | H04W 74/0808 |

* cited by examiner

SYSTEMS FOR AND METHODS OF MULTILINK OPERATION USING BEACON RECEPTION PATTERNS

FIELD OF THE DISCLOSURE

This disclosure generally relates to systems for and methods of communication between an access point (AP) and a client device (e.g., a station (STA)) or between other communication devices. In some embodiments, this disclosure generally relates to systems and methods related to multilink operations including but not limited to systems and methods that establish and/or maintain a connection using a multilink operational protocol for saving power or more efficiently using power.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA), etc. As higher data throughput and other changes develop, newer standards are constantly being developed for adoption, such as a progression from IEEE 802.11n to IEEE 802.11ac and 802.11be. Devices can utilize multiple links to transmit and receive data on a connection. Establishing and maintaining multiple link connections consumes power.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
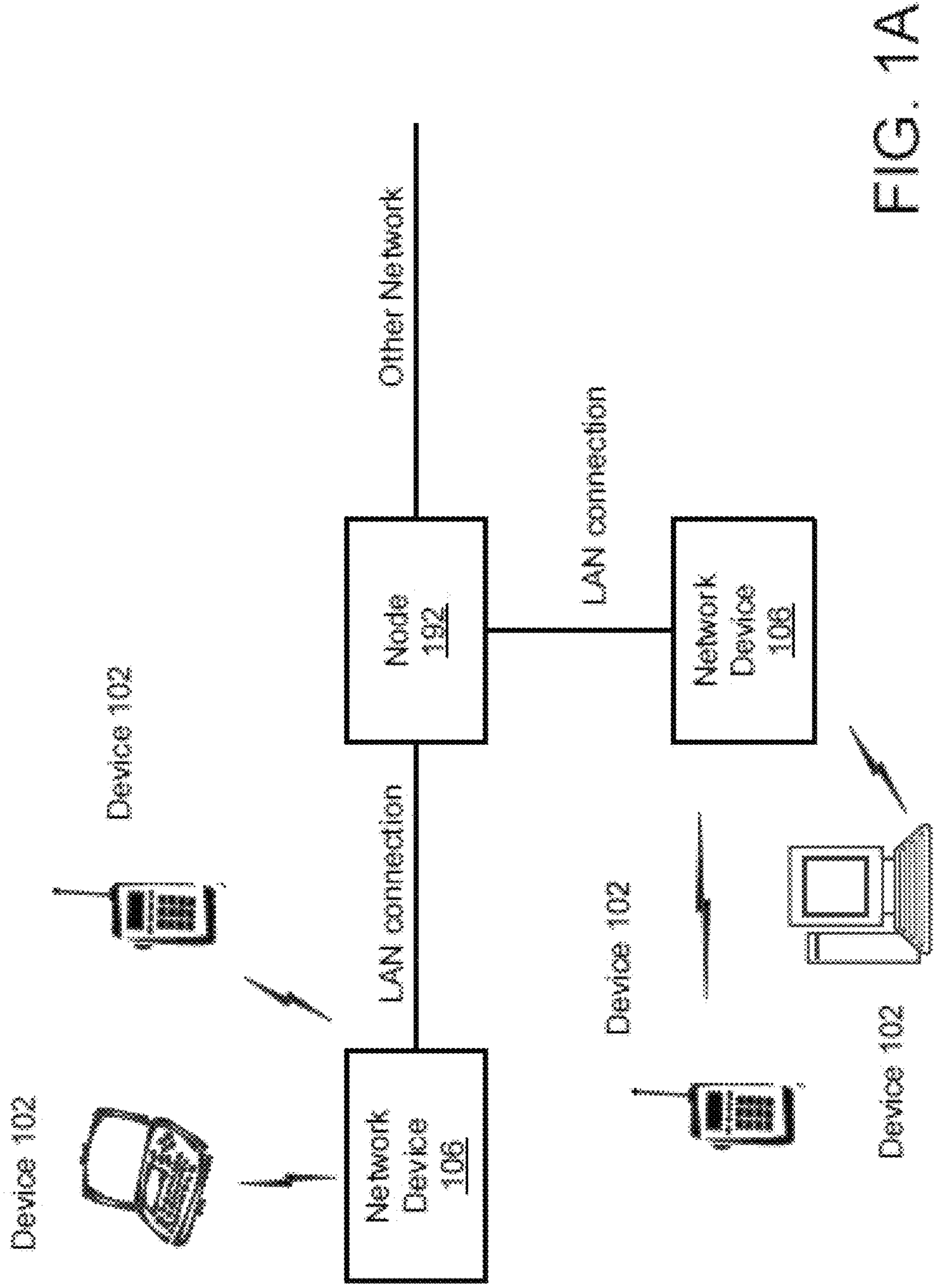
FIG. 1A is a block diagram depicting a network environment including one or more access points (APs) in communication with one or more devices or stations (STAs), according to some embodiments.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: WiFi Alliance standards and IEEE 802.11 standards including but not limited to IEEE 802.11a™, IEEE 802.11b™, IEEE 802.11g™, IEEE 802.11be™, IEEE P802.11n™; IEEE P802.11ax™; and IEEE P802.11ac™ standards. The IEEE 802.11be specification (e.g., for WiFi7 devices) provides for the use multiple links to transmit/receive data (e.g., multi-link operation (MLO)) to reduce latency and improve throughput. Although this disclosure can reference aspects of these standard(s), the disclosure is in no way limited by these standard(s).

For purposes of reading the description of the various embodiments below, the following descriptions of the sections of the specification and their respective contents can be helpful:

Section A describes a network environment and computing environment which can be useful for practicing embodiments described herein; and Section B describes some embodiments of protocols, algorithms, and operations for MLO.

Some embodiments disclosed herein are related to protocols, operations, and algorithms that allow more efficient use of MLO. In some embodiments, algorithms and parameters are used to provide beacon reception patterns that require less power than conventional beacon patterns used in multilink operations. The systems and methods can be used with battery restricted devices (e.g., mobile phones, mobile access points (APs)) to conserve power consumption during MLO and when activity is low. In some embodiments, a connection maintenance protocol is provided for a WiFi network (e.g., IEEE 802.11be network, etc.), a cellular network, point to point communications, or combinations thereof. The connection maintenance protocol can be used with any type of communication device. In some embodiments, the connection maintenance protocol uses adaptive beacon reception patterns.

In some embodiments, the systems and methods provide efficient multilink connection management while using less power at low latency. In some embodiments, the systems and methods achieve less power consumption in a multilink connection without degradation in roam performance, without loss in broadcast/multicast traffic, and with low latency for downlink traffic.

A connection may refer to communication instituted between nodes (such as a wireless communication between nodes) for exchanging data according to a protocol in some embodiments. In some embodiments, a connection is established using the three-way or four-way handshake mechanism (via discovery, authentication, and association operations) in some embodiments. The connection can be a wireless connection to or from a client device (e.g., a STA) and AP or can be between other types of communication devices. The device can be an 802.11 WiFi network (e.g., IEEE 802.11be with enhancements for extremely high output (HT)) device in some embodiments.

A connection may have one or more links. A link may refer to a wireless channel for communicating data in some embodiments. Multilink operation may refer to the provision of data over more than one link for a connection in some embodiments. One logical connection may include two or more wireless links in some embodiments. The client device or AP can be implemented in a device including one or more integrated circuits (ICs) packaged in an IC package. In some embodiments, the IC package includes an IC that supports WiFi7 and enables MLO. As part of WiFi7 operations, a STA could be associated in multiple links with the same AP and operate simultaneously on each link according to MLO.

Generally, a connection is made when a STA begins scanning the wireless frequencies for wireless APs or, if using ad hoc mode, other wireless devices in a probing process. During the probing process, the STA sends a probe request. The probe request is a type of WiFi management frame that asks what networks or if specific networks are available on a particular channel and are sent using broadcast address in some embodiments. The probe request can be sent after beacon messages or frames are received from the AP in some embodiments. In some embodiments, probe requests include a particular network name or service set identifier (SSID). A probe response is a type of WiFi management frame provided in response to the probe request. The probe response includes the SSID (wireless network name), supported data rates, encryption types and other capabilities of the AP in some embodiments. After the probe response is received, the STA chooses an AP using the information in the probe response and other received probe responses from other APs, if any, and the probing process is complete.

After the probing process is complete, the authentication process begins so that an authenticated state can be achieved. Generally, the authentication process begins when the STA sends authentication request. The authentication process further includes providing an authentication frame from the AP in response to the authentication request. The authentication process is complete after the STA receives the authentication frame. At this point the STA is in an authenticated state but has not yet reached the associated state.

The association process is a process during which the STA reaches an associated state with the AP and can be an open or keyed association process. The association process begins after the authentication process when the STA determines with which AP it chooses to associate in some embodiments. The STA can select an AP based on the SSID, signal strength, and frame error rate characteristics associated with communication with the AP. Generally, the association process begins when the STA sends association request to the selected AP. The association request is management frame that contains chosen encryption types if required and other compatible 802.11 capabilities in some embodiments. The association process further includes providing an association ID for the AP in the AP and sending an association response from the AP in response to the association request. The association response is management frame that includes a success message granting network access to the STA. The association process is complete after the STA receives the association response and the STA reaches the associated state.

Beacon signals or frames can be broadcasted periodically by devices (e.g., access points) to announce their presence and provide information for network discovery, synchronization, power management, and other network-related functionalities. In some embodiments, a STA receives beacons at regular intervals to maintain the connection, and the beacon signals or frames are provided on each link of the connection in a MLO according to a pattern. The STA can use the beacon frame to assess whether to roam to another AP based upon received signal strength indicator levels, loss, etc. in some embodiments. Waking up a link or device for receiving beacons consumes power.

Some embodiments relate to a first device. The first device includes a circuit configured to provide frames across a connection including one or more links to a second device. The circuit is configured to use a beacon reception pattern where first intervals on a first link are alternately disposed with second intervals on a second link.

In some embodiments, the frames are provided according to an 802.11 protocol and the first intervals are for listening for a beacon frame. In some embodiments, the circuit is configured to select the beacon reception pattern for the first link, the second link, a third link, or more. Under 802.11 protocol, n links are used for multilink operations, where n is between 1 and 16, in some embodiments. The beacon reception pattern is chosen in response to a low battery condition or a roam decision.

In some embodiments, the circuit is configured to use during a low battery condition a lower power consuming link of the first link and the second link for receiving a beacon frame. In some embodiments, the first device the second device are each one of mobile station devices or mobile access points. In some embodiments, the beacon reception pattern is selected using an energy or charge drain parameter for reception of a beacon. In some embodiments, at least one of the first link and the second link uses the 2.4 GHz frequency band, and another of the links uses the 5 GHZ frequency band. In some embodiments, one or more links are in the 2.4 GHz frequency band, one or more links are in 5 GHz frequency band, and one or more links are in the 6 GHz frequency band.

Some embodiments relate to a first device. The first device includes a circuit configured to provide multilink operations across a connection to a second device. The circuit is configured to select a beacon reception pattern for a first link, a second link, and a third link. The beacon reception pattern is chosen in response a low battery condition, a delivery traffic indication map setting, or a roam decision.

In some embodiments, the circuit is configured to use the beacon reception pattern. First intervals on the first link are alternately disposed with second intervals on the second link. In some embodiments, the beacon reception pattern is chosen in response the low battery condition or the roam decision. In some embodiments, the circuit is configured to use during the low battery condition a lower power consuming link of the first link and the second link for receiving a beacon frame.

In some embodiments, the first device the second device are each one of mobile station devices or mobile access points. In some embodiments, the beacon reception pattern is selected using an energy or charge drain parameter for reception of a beacon.

Some embodiments relate to a first device. The first device includes a circuit configured to provide multilink operations across a connection to a second device. The circuit is configured to use a beacon reception pattern in response to a low battery condition or delivery traffic indication map setting. The beacon reception pattern has less first listen intervals per period on a first link than a number (greater than 1) of second listen intervals on a second link.

In some embodiments, the low battery condition is associated with a battery of the first device being below a first threshold and the first device being solely on battery power. In some embodiments, the first device includes a first oscillator for the first link and a second oscillator for the second link. In some embodiments, the first listen intervals on the first link are alternately disposed with the second listen intervals on the second link. In some embodiments, the circuit is configured to select the beacon reception pattern for the first link, the second link, and a third link. The beacon reception pattern is chosen in response the low battery condition or a roam decision. In some embodiments, the beacon reception pattern is selected in response to a reception level on the first link. In some embodiments, one or more links are in the 2.4 GHz frequency band, one or more links are in 5 GHz frequency band, and one or more links are in the 6 GHz frequency band.

A beacon reception pattern may refer to a distribution of listen intervals for receiving a beacon frame in some embodiments. The beacon frame can be transmitted by an AP. A listen interval can refer to a period of time for receiving a signal such as a beacon frame. Generally, links, radios or devices are active during the listen interval. A roam decision may refer to a conclusion to switch a connection from one device (e.g., AP or base station) to another device in some embodiments. The decision can be made based in response to various factors, such as signal strength, data rate, and quality of the connection. Alternately disposed may refer to a continuing pattern where an interval on a first link is followed in time by an interval on another link before a next interval is provided on the first link in some embodiments. An energy or charge drain parameter may refer to an amount of energy or charge removed from a battery due to an operation (e.g., beacon frame reception) in some embodiments.

An idle condition may refer to the state of a wireless device or connection when the device or connection is not actively transmitting or receiving data in some embodiments. In some embodiments, an idle state is when a device is powered on and connected to the wireless network, but is not actively transmitting or receiving data. In this state, the device can be waiting for data to send or waiting for incoming data. A sleep state or sleep mode can refer to a mode where a device conserves power in some embodiments. In some embodiments, a device may enter a sleep state to conserve power when not actively participating in communication. In the sleep state, the device essentially turns off certain components (e.g., the radio or oscillators) to reduce power consumption. When the device needs to communicate, the device wakes up from the sleep state. For example, a link can be placed in a sleep mode to reduce power being used by components associated with the link. For example, a radio or oscillator for a link can be turned off in a sleep mode for the link while a radio or oscillator for other links remains on. A lower power consuming link may refer to a link in a multilink operation that is using less power than another link in the MLO. In some embodiments, the lower power consuming link consumes a least amount of power or a low level of power in some embodiments.

In some embodiments, the frames are provided according to an 802.11 protocol and the connection is established by using an association or authentication operation.

In some embodiments, during the low battery condition, the circuit is configured to use during an idle condition a lower power consuming link of the links for link management operations, is configured to use during the idle condition the lower power consuming link of the links for beacon synchronization operations.

A frame may refer to a digital data transmission unit in some embodiments. In some embodiments, the frame is provided according to an 802.11 protocol. For example, a frame may refer to a container for a single network packet. A data frame may refer to a frame that contains data in some embodiments. In some embodiments, a management frame may refer to a frame for control or management operations including but not limited to beacon frames, probe request/response frames, authentication request/response frames, association request/response frames, deauthentication frames, disassociation requests (e.g., frames), etc. A beacon message or beacon frame may refer to a management frame that is periodically transmitted by an access point within a wireless network in some embodiments. The beacon frame can contain broadcast information about the network, enabling nearby devices, such as laptops or smartphones, to discover and connect to the network seamlessly. The beacon message can include the network's name (SSID), supported data rates, security settings, traffic indication maps, and other configuration parameters in some embodiments. Beacon synchronization operations may refer to timing operations involving one or more beacon frames. Beacon synchronization operations may involve clock synchronization, beacon time stamps and beacon intervals in some embodiments.

Power consumption characteristics may refer to energy or power required for a link associated with a connection in some embodiments. Power consumption characteristics can include power per spatial stream, power per throughput, etc. for a link in some embodiments. A number of spatial streams can refer to a number of spatial streams defined in the 802.11 standard or links in a multilink operation in some embodiments. A low battery condition may refer to a condition where a battery power level, voltage or energy level is below a threshold in some embodiments. A low battery condition may not include a condition where a battery has a power level below a threshold and is powered by a different source (grid or other battery).

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) or network devices 106, one or more client devices (e.g., STAs or mobile STAs) or wireless communication devices 102 and a network hardware component or network hardware 192. The wireless communication devices 102 can for example include laptop computers, tablets, personal computers, and/or cellular telephone devices. The details of an embodiment of each station or wireless communication device 102 and AP or network device 106 are described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections. Network devices 106 are 5G base stations in some embodiments. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wireless-fidelity (WiFi), or other standards. A network device 106 or AP can sometimes be referred to as a wireless access point (WAP). A network device 106 or AP can be implemented (e.g., configured, designed and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
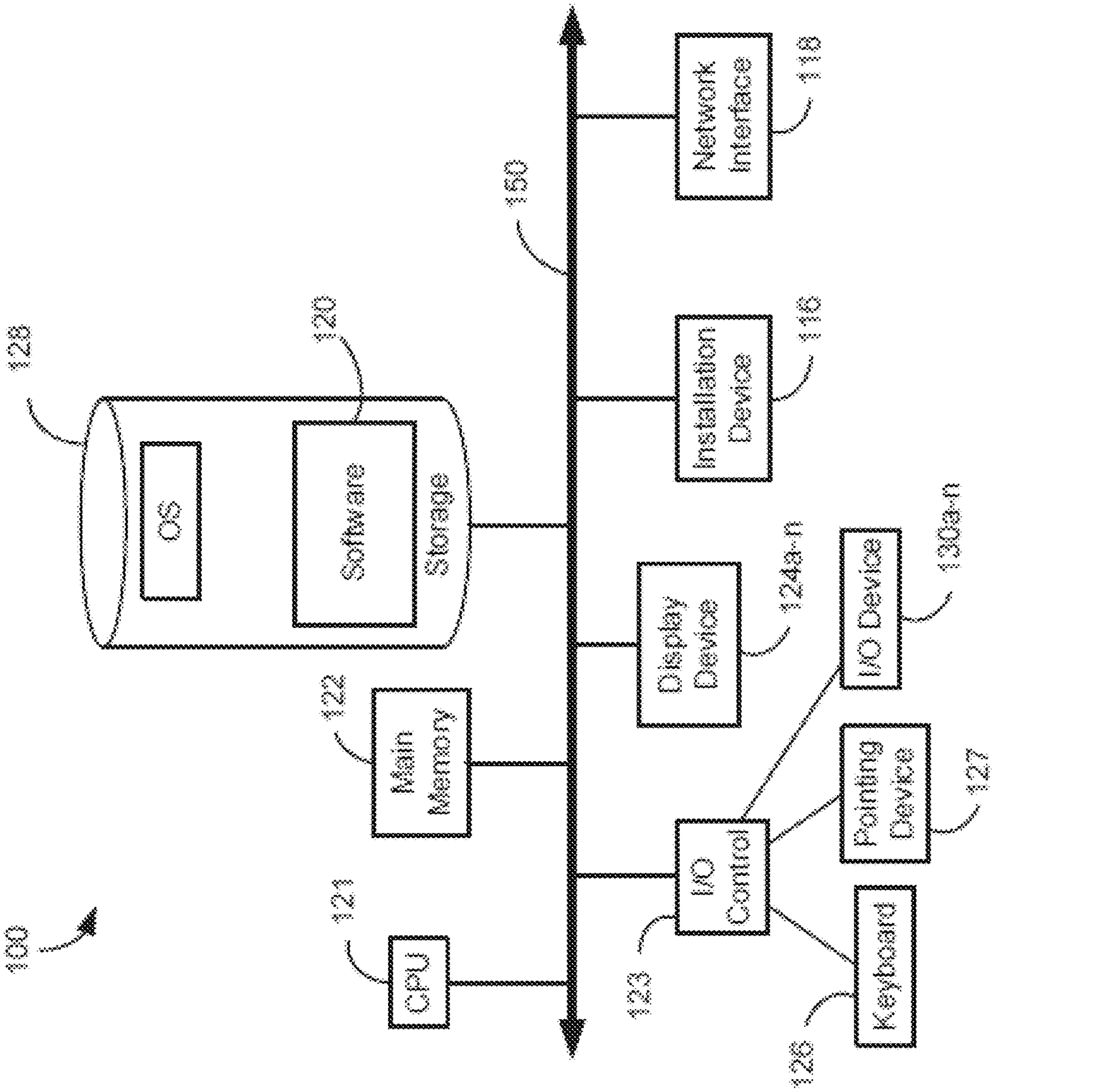
FIGS. 1B and 1C are block diagrams depicting computing devices useful in connection with the methods and systems described herein, according to some embodiments.
Figure 1C:
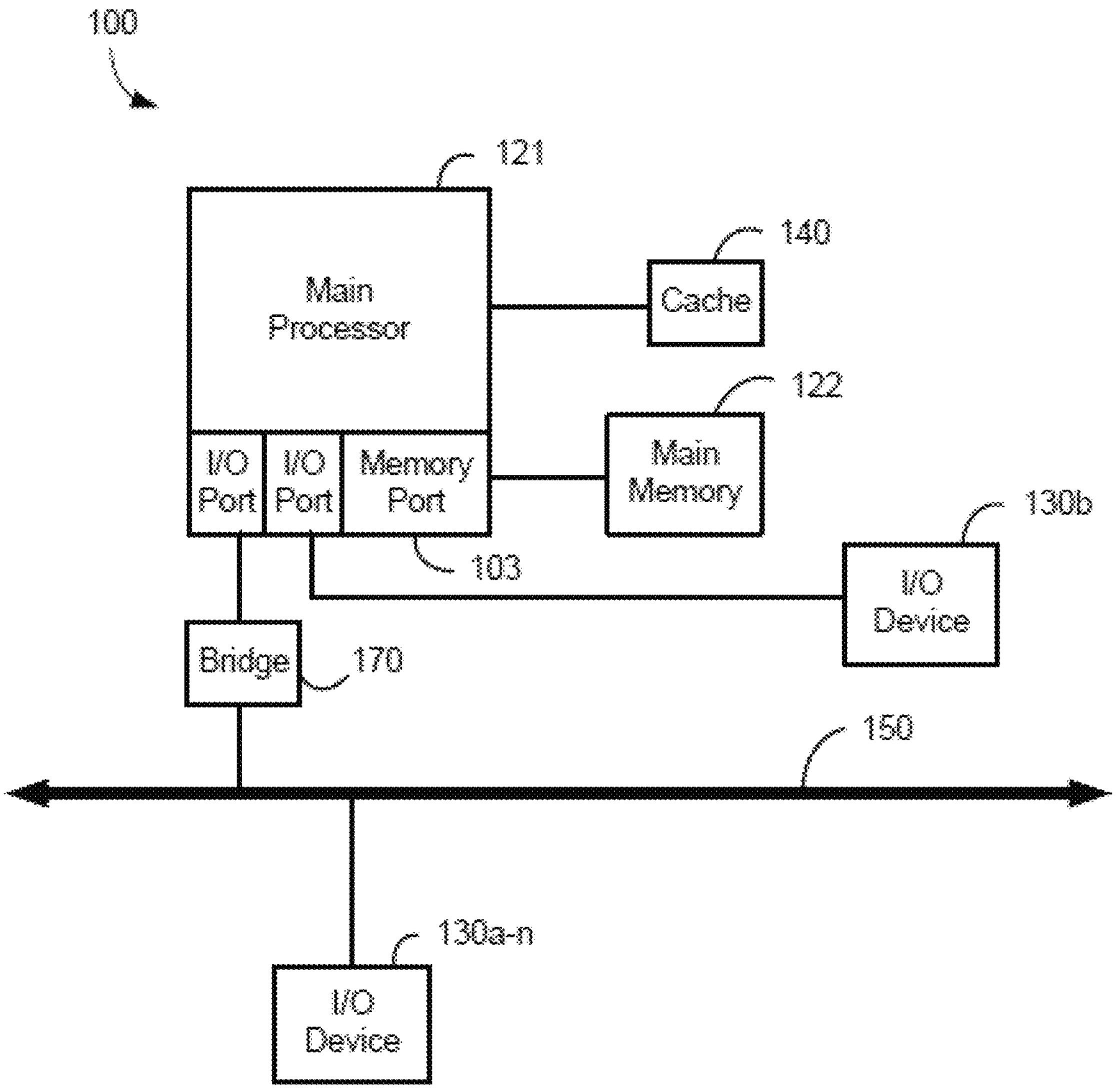

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124*a*-124*n*, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130*a*-130*n*, and a cache memory 140 in communication with the central processing unit or processor 121.

The central processing unit or processor 121 is any logic circuitry that responds to and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor 121 communicates with various I/O devices 130 via a local system bus (e.g., system bus 150). Various buses can be used to connect the central processing unit or processor 121 to any of the I/O devices 130, for example, a VESA VL bus, an ISA bus, an EISA bus, a Micro Channel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* can be present in the computing device 100. Input devices include keyboards, mice, track pads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124*a*-124*n*. As such, any of the I/O devices 130*a*-130*n* and/or the I/O controller 123 can include any type and/or form of suitable hardware, software, or combination of hardware and software to support, enable or provide for the connection and use of the display device(s) 124*a*-124*n* by the computing device 100. For example, the computing device 100 can include any type and/or form of video adapter, video card, driver, and/or library to interface, communicate, connect or otherwise use the display device(s) 124*a*-124*n*. In one embodiment, a video adapter can include multiple connectors to interface to the display device(s) 124*a*-124*n*. In other embodiments, the computing device 100 can include multiple video adapters, with each video adapter connected to the display device(s) 124*a*-124*n*. In some embodiments, any portion of the operating system of the computing device 100 can be configured for using multiple display devices 124*a*-124*n*. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre Channel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. MLO Beacon Operations and Methods and Devices Using Such Operations

Disclosed herein are systems and methods that can be used in any communication system including but not limited to Wi-Fi and LTE networks. The systems and methods can be used with an AP or STA in a communication network such as the devices discussed with reference to FIGS. 1A-C. Although embodiments of MLO operations for communications under the IEEE 802.11 be standard are described herein, the systems and methods can be used with other networks (e.g., cellular and satellite networks) and in point to point communications.

Multilink STA beacon reception can be performed at regular intervals to maintain the connection using different patterns or sequences on each link. In some embodiments, systems and methods provide for beacon reception on multiple links to maintain the link health and trigger roam operations if required without inefficiently using power on multiple links which can result in more power consumption and less battery life.

Figure 2A:
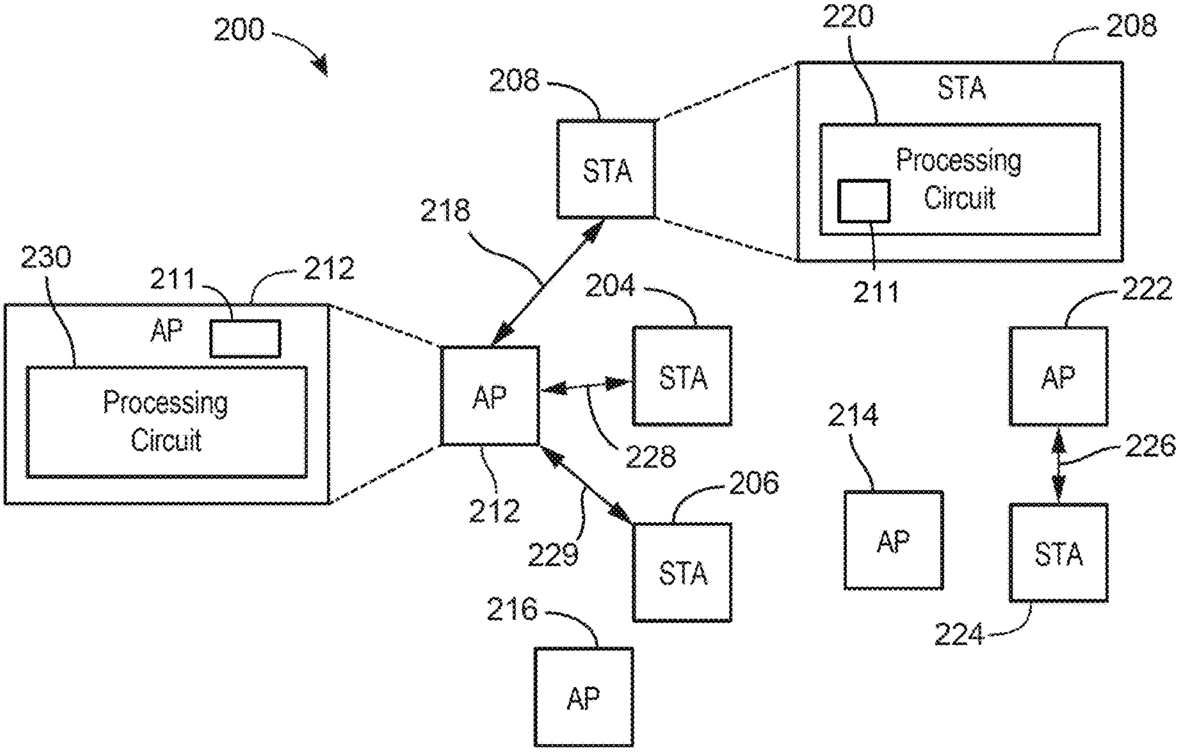
FIG. 2A is a block diagram depicting a network including APs and STAs according to some embodiments.

With reference to FIG. 2A, a wireless communication network or system 200 includes client devices or STAs 204, 206, 208, and 224 and APs 212, 214, 216, and 222. STAs 204, 206, 208, and 224 and APs 212, 214, 216, and 222 can be used in the systems discussed with reference to FIGS. 1A-C. Any number of STAs 204, 206, 208, and 224 and APs 212, 214, 216, and 222 can be used in the network or system 200. STAs 204, 206, 208, and 224 and APs 212, 214, 216, and 222 are mobile battery powered devices including a battery 211 in some embodiments. A STA or client device may refer to any device for communicating in communication system and includes but is not limited to a fixed, portable, or mobile laptop, desktop personal computer, personal digital assistant, workstation, wearable device, smart phone, or Wi-Fi phone in some embodiments. An access point or AP may refer to a device for communicatively coupling one or more non-AP devices (e.g., a client device or STA) to a network in some embodiments. An AP may enable non-AP devices to connect and communicate with a network in some embodiments. In some embodiments, an AP is a wireless access point (WAP) configured to enable wireless communication between non-AP devices. An AP includes but is not limited to a mobile, portable, or fixed hot spot, router, bridge, gNB node, eNodeB, evolved node B, or other communication device. An AP can provide services to a STA, such as, serving as a connection point to another network.

STAs 204, 206, 208, and 224 and APs 212, 214, 216, and 222 can each include a wireless transceiver and various modules for communicating via connections. The modules can be software (e.g., firmware), hardware components, and combinations thereof. In some embodiments, each of STAs 204, 206, 208, and 224 and APs 212, 214, 216, and 222 includes an IEEE 802.11 conformant media access control (MAC) layer circuit and physical (PHY) layer interface to the wireless medium and can be part of a larger device or system. In some embodiments, each of STAs 204, 206, 208, and 224 and APs 212, 214, 216, and 222 operates according to other standards than the IEEE 802.11 standard.

A connection for wireless communication can be established between at least one of STAs 204, 206, 208, and 224 and APs 212, 214, 216, and 222 after authentication and association operations. For example, STA 208 has a connection 218 to AP 212. STAs 204, 206, 208, and 224 each include circuitry (e.g., a processor or processing circuit 221), and APs 212, 214, 216, and 226 each include circuitry (e.g., a processing circuit 230) for establishing and cancelling the connection 218 and communicating data across the connection. In another example, STA 204 has a connection 228 to AP 212, and STA 206 has a connection 229 to AP 222. STAs 204, 206, 208, and 224 each include circuitry (e.g., a processor or processing circuit 230), and APs 212, 214, 216, and 222 each include circuitry (e.g., a processing circuit 233) for operating according to MLO operations. The connections 218, 228, 229 and 226 are wireless connections formed using an association and/or authorization operation and cancelled using a disassociation and/or deauthentication operation in some embodiments. The connections 218, 228, 229 and 226 can be single link, multilink or dual link connections associated with APs 212 and 222 and can be a secure connection (e.g., using encryption) in some embodiments. In some embodiments, the connections 218, 228, 229 and 226 provide data communications and control and management communications on one or more channels in a 5G, 6G, 60G, or 2G band.

Figure 2B:
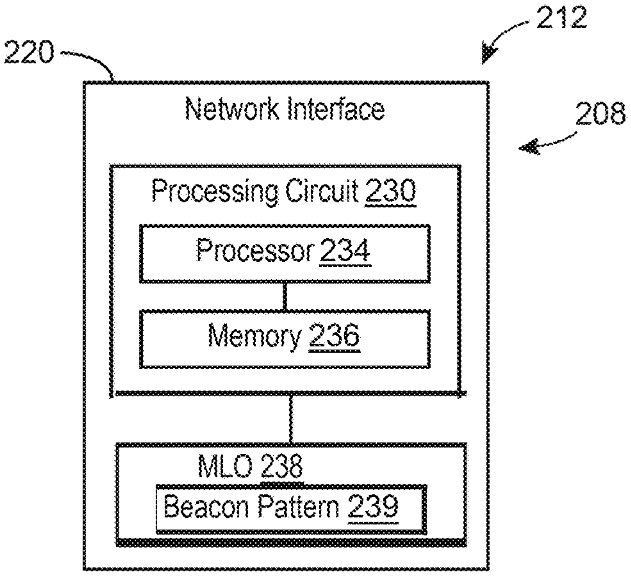
FIG. 2B is a more detailed block diagram of an AP or STA in the network illustrated in FIG. 2A configured for a multilink operation according to some embodiments.

Referring to FIG. 2B, a device 220 is an AP 212 or STA 208 (FIG. 2A) and is configured for an MLO protocol according to some embodiments. In some embodiments, device 220 includes a processing circuit 233, and an MLO module 238. The term MLO module may refer to a module that controls, processes, and/or provides multilink operations in some embodiments. The processing circuit 233 is any circuitry or components that can perform logic and communication processing operations and can include a processor 234 and a memory 236 in some embodiments. Multilink operations may refer to communication across a connection using more than one link in some embodiments. A multilink operation can be considered a multilink operation even though a single link is used at certain times for the connection (e.g., according to power savings features described herein) in some embodiments.

In some embodiments, the processing circuit 230 is implemented as a field-programmable gate array, an application-specific integrated circuit, hardware, a software executing processor, or state machines. In some embodiments, the processing circuit 230 is part of layers (e.g., MAC, network, PHY layers) of IEEE 802.11 standard devices. The processing circuit 230 can be configured to perform communication operations, MLO, frame building and processing, probe request and response operations, discovery operations, association operations, authorization operations, connection setup, disassociation operations, handoff operations, and deauthentication operations in some embodiments. The MLO operations include the provision and reception of beacon frames for MLO connections and maintenance thereof in some embodiments. Instructions for the processing circuit 230 are stored in a non-transitory medium such as memory 236 in some embodiments. Processing circuit 221 of STA 208 and processing circuit 233 of AP 212 are similar to processing circuit 230 in some embodiments.

The memory 236 may be one or more devices (e.g., RAM, ROM, Flash memory, hard disk storage) for storing data and/or computer code for completing and/or facilitating the various processes described herein. The memory 236 may be or include non-transient volatile memory, non-volatile memory, and non-transitory computer storage media. Memory 236 may include database components, object code components, script components, or any other type of information structure for supporting the various activities and information structures described herein. Memory 236 may be communicably coupled to the processor 234 and include computer code or instructions for executing one or more processes described herein. The processor 234 may be implemented as one or more application specific integrated circuits (ASICs), field programmable gate arrays (FPGAs), a group of processing components, a software executing processor, state machines or other suitable electronic processing components. As such, AP, STA, or network device 106 (FIG. 1A) is configured to execute a variety of modules and/or programs and store associated data in a database of the memory 236. The modules (e.g., module 238) can be implemented in AP software (e.g., MAC layer or PHY layer software) or STA software (e.g., MAC layer or PHY layer software). In some embodiments, the AP 212 or STA 208 (FIG. 2A) is structured and used to establish connections and hand off access to other computing systems and devices (e.g., wireless communication device(s) 102, network hardware 192, other access points or network devices 106, (FIGS. 1A-C) via a network (e.g., WAN connection, LAN connection, WLAN connection, etc.).

In some embodiments, the MLO module 238 is configured to provide MLO operations adapted for power saving operation or to preserve battery 211. For example, the MLO module 238 is configured to use beacon reception patterns that are configured to use less power. The beacon reception patterns can be used for link management during MLO in some embodiments. Link management operations may refer to operations for establishing, maintaining, and optimizing the communication link between wireless devices in some embodiments. The link management operations attempt ensure to reliable and efficient wireless communication across a connection in some embodiments. Link management operations include but are not limited to association, reassociation, authentication, deauthentication, disassociation, roaming, power management, quality of service (QOS), dynamic rate selection, frame aggregation, fast BSS transition, etc.

The use of beacon reception patterns reduces power consumption as compared to simultaneously receiving all beacons on all links and yet allows all links to be monitored for downloads and roaming in some embodiments. For example, the beacon reception patterns can be provided at alternative intervals in each link to save power. The beacon reception patterns 237 (e.g., the sleep patterns) are be selected based on multiple factors and are selected dynamically in some embodiments.

In some embodiments, device 220 wakes up to receive beacon frames according to the beacon reception patterns. The patterns can have alternate intervals on each link in a mutually exclusive manner to receive the beacon frames in some embodiments. In some embodiments, different patterns are stored as patterns in device 220 and the appropriate pattern can be chosen based upon MLO operation, battery drain parameters, connection requirements, battery level, etc. For example, device 220 receives a beacon frame on a first link (e.g., in a first band) at 100 milliseconds (ms) from a beginning of a 1 second period while a second oscillator or radio for a second link is in a sleep or power save mode, and the device receives a beacon frame on the second link at 200 ms from the beginning while a first oscillator or radio for the first link is in a sleep or power save mode. The first radio or local oscillator can wake up at 300 ms while the second oscillator or radio is in a sleep mode in some embodiments. The second radio or local oscillator can wake up at 200 ms and 400 ms while the first oscillator or radio is in a sleep mode in some embodiments. At any point of time only one of the links will be active to receive the beacon frame in some embodiments. The respective radio or local oscillator powers down after receiving the beacon frame in some embodiments. Any RSSI changes in any of the links can be tracked, and roam can be triggered on each link and downlink packets are received with low latency. An oscillator may refer to any circuit for providing a frequency signal (e.g., a radio frequency signal for a radio) in some embodiments.

In some embodiments, the beacon frames are received at alternate Delivery Traffic Indication Message (DTIM) intervals in each link. A DTIM is a message that is sent to clients or STAS on the network that are power-managed, informing the STAS that there is information that needs to be sent to them so they can become active again to receive it. A DTIM interval can generally be set to 1-255 under the 802.11 standard. The DTIM interval determines how often a DTIM beacon is transmitted in the units of beacon interval. A DTIM setting of 3 means that every third beacon is a DTIM beacon, whereas a DTIM interval of 1 means that every beacon is a DTIM beacon. A delivery traffic indication map setting may refer to a parameter used to indicate how often a beacon will be transmitted in some embodiments.

In some embodiments, beacon reception patterns can be used with more than two links (e.g., n links). In some embodiments, the beacon reception pattern for a multilink connection with n links is configured for power savings. For example, the beacon reception patterns (e.g., the listen patterns associated with sleep patterns) are be selected based on multiple factors and are selected dynamically for n links in some embodiments. According to one example, when the RSSI/reception levels are strong on all links and the device is operating with sufficient power, a pattern can be chosen to switch links sequentially. According to another example, when the RSSI/reception levels are strong on all links and the device is operating in a power saving mode (e.g. due to a low battery condition), a pattern is chosen to save power. The pattern can be chosen to receive most beacon frames on the lowest power consuming link. The least power consuming link is used for link management operations in some embodiments.

According to one example, when the RSSI/reception levels are not strong on all links and the device is operating with sufficient power, a pattern can be chosen to monitor the roam-expected link more often, but at the same time the pattern fairly distributes beacon reception on other links to not to impact the overall connection. According to one example, when the device is operating in a power save mode, a pattern can be chosen to save power by receiving the beacon frames on the best link more often than other links. In some embodiments, the other links receive the beacon frames less often but at a level to provide fairness to roam decisions. Other configurations for beacon reception parameters can be provided.

In some embodiments, MLO module 238 is configured to assist decreasing the power consumption in a during MLO by using the adaptive beacon reception methods. The adaptive beacon reception methods decrease the power consumption in a multilink connection by decreasing the intervals at which STA wakes up to receive the beacons in some embodiments. In some embodiments, MLO can be achieved with the same or slightly more power consumption than the non-multilink connection. RSSI changes in any link is monitored for roam triggering, and there is no loss in broadcast/multicast traffic as AP sends broadcast/multicast indications in all the links. As RSSI levels approach levels that indicate a roam operation may be needed in the future, the pattern can be adjusted to receive beacon frames more often on the link.

In some embodiments, the MLO module 238 configures or selects beacon patterns according to battery power levels or energy storage levels. Once the battery status changes (higher power level or device receives another power source (e.g., grid), patterns with more listening intervals for links can be provided. In some embodiments, the beacon patterns for power saving as described above are only entered when a low battery condition is present. In some embodiments, the beacon patterns described above are used regardless of battery condition. In some embodiments, a user can enable for disable the use of adaptive beacon patterns. Management frames can include fields defining the timing of listening intervals (length, frequency, number) per link and can be exchanged between APS and STAS in some embodiments. The management frames can be provided during the establishment of the connection and can be updated over the life of the connection in some embodiments.

Figure 3:
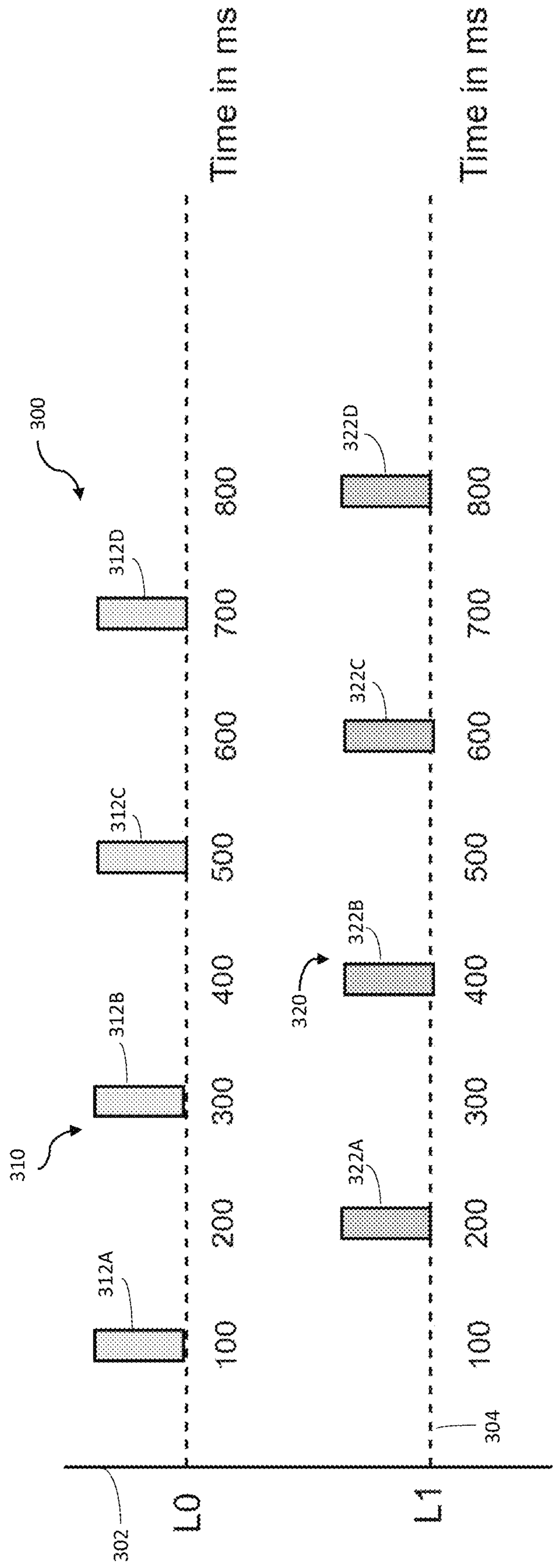
FIG. 3 is a timing diagram showing a beacon reception pattern for operations involving the AP or STA illustrated in FIG. 2B according to some embodiments.

With reference to FIG. 3, beacon patterns 300 includes a beacon pattern 310 corresponding to Link0: L0 on an x-axis 303 and a y-axis 302 and a beacon pattern 320 corresponding to Link1: L1 on an x-axis 304 and the y-axis 302. Y-axis 302 represents listening state, and x-axis represent time. Pattern 310 includes listening or beacon intervals 312A-D for a first link, and pattern 320 includes listening or beacon intervals 322A-D for a second link. Intervals 312A-D are alternatively placed every 200 ms with intervals 322A-D. Beacon pattern 320 can be adjusted such that the pattern does not include intervals 322A and 322C to save power under certain conditions. Similarly, beacon pattern 310 can be adjusted such that the pattern does not include intervals 310B and 310D to save power under certain conditions. In some embodiments, beacon pattern 320 can be adjusted such that the pattern does not include intervals 322A, 322B and 322C. Patterns 310 and 320 can include various numbers of intervals interspaced at various time intervals according to system parameters and communication requirements.

Figure 4:
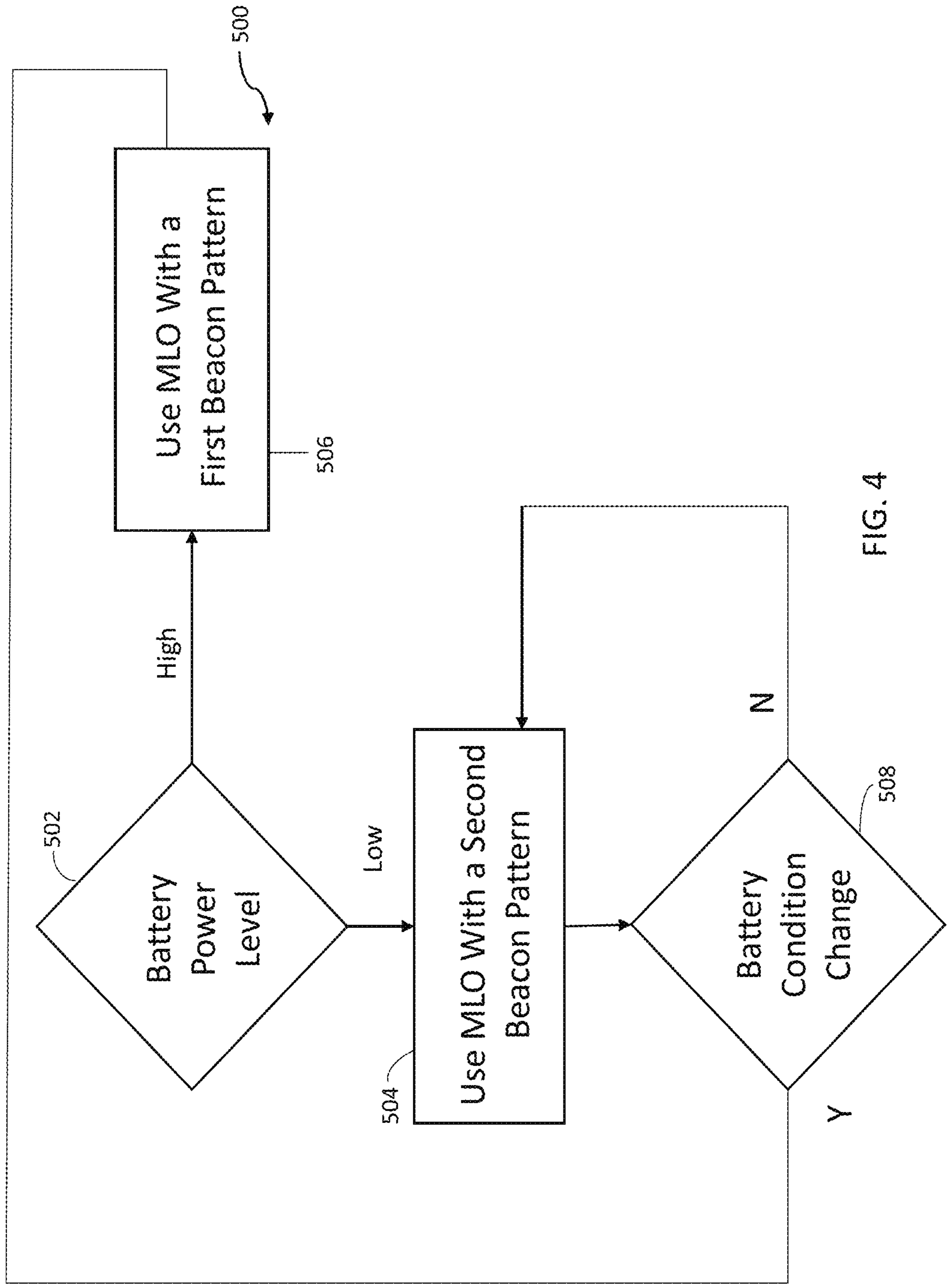
FIG. 4 is a flow diagram depicting a low battery operation involving the AP or STA illustrated in FIG. 2B according to some embodiments.

With reference to FIG. 4, a flow 500 can be used by device 220 (FIG. 3). At an operation 502, a battery condition is determined. The battery condition can be determined based upon its output voltage or other indicator of storage available in the battery. Device 220 can include a sensor for sensing a low battery condition. A low battery condition can be determined when the sensed parameter is below a threshold. The threshold can be fixed or programmable. In some embodiments, the threshold is increased as the lifetime of the battery increases (e.g., older batteries have higher thresholds).

If the battery condition is low, device 220 advances to operation 504. At operation 504, device 220 uses a second beacon pattern (e.g., an adaptive beacon pattern) for MLO. In some embodiments, the second beacon pattern can be pattern 300 (FIG. 3) or a pattern provided in accordance with the information in Table I described below in some embodiments. At an operation 508, device 220 determines if the device 220 if the battery level has increased above a threshold, and if so, advances to operation 502. At operation 502, if the battery condition is above the threshold, device 220 advances to operation 506 and uses a first beacon pattern different than the second beacon patterns for MLO in some embodiments. The first beacon pattern can be a non-adaptive beacon pattern and provided according to an existing 802.11 standard in some embodiments.

In some embodiments after operation 508, device 220 remains using adaptive beacon patterns until an operational change occurs even though the battery condition has changed. For example, device 220 can continue to use adaptive beacon patterns until a traffic scenario changes, until a roaming event, a channel change is necessary, an idle state is entered, etc.

By using adaptive beacon patterns, the power consumption can be reduced as follows according to Example I below.

Example 1

Px: power STA is using band (x) for Beacon Reception (Rx) without adaptive beacon pattern.

Py: power STA is using band (y) for Beacon Rx without adaptive beacon pattern.

Total power equals (Px+Py) for STA is using both band (x) and band (y) for Beacon Rx without adaptive beacon pattern.

Total Power equals (Px+Py)/2 and is between Px and Py for BEACON Rx with ST using an adaptive beacon pattern according to some embodiments.

Other amounts of power saving can be achieved depending upon system parameters and communication requirements. Various beacon patterns can be used to achieve various amounts of power savings.

Power consumption of a multilink STA receiving beacon frames on two links over a 1 second period when the multilink STA receives beacons in both the links with a DTIM setting of 1 and a beacon interval of 100 ms is defined as follows.

Total Power consumed to receive the beacons in 1 second $=N*P_1+N*P_2$

Where N is the number beacons received in 1 second on links 1 and 2;

$P_1$ is power consumed to receive a beacon in Link1;

$P_2$ is power consumed to receive a beacon in Link2.

N is equal to 10 so Total Power equals 10 $(P_1+P_2)$.

Power consumption of a Multilink STA receiving alternate beacon frames on two links (e.g., patterns 300 (FIG. 3)) over a 1 second period when the multilink STA receives beacons on both the links with a DTIM setting of 1 and a beacon interval as 100 ms is defined as follows. N is equal to 5 so Total Power equals $5(P_1+P_2)$. In some embodiment, links sleeping alternatively is the best or a favorable pattern with respect to roam and power consumption.

In some embodiments, for a multilink connection with n links (e.g., where n is greater than 2), the sleep or beacon reception pattern is selected based on multiple factors. In some embodiments, for a multilink connection with n links, the sleep or beacon reception pattern is selected dynamically. Dynamic selection may refer to the selection of a pattern that can change during the lifetime connection in some embodiments. For example, dynamic selection may include selections that are made throughout the lifetime of the connection based upon, power levels, traffic, latency requirements, etc. as opposed to a fixed selection made once for the lifetime of the connection.

In some embodiments, when the RSSI/reception levels are strong on all n links and device is operating in sufficient power, the pattern chosen can be to switch links sequentially. In some embodiments, if the device is operating in power saving mode, the pattern is chosen to save power and a pattern can be chosen to receive most beacon frames on the lowest power consuming link.

Table 1 below shows data that can be used to make the appropriate election when the RSSI/reception levels are not strong on all n links and a roam is impending in one/more of the links. In some embodiments, if the device is operating with sufficient power, the pattern can be chosen to monitor the roam-expected link, but at the same time fairly distribute beacon reception on other links to not to impact the overall connection. In some embodiments, if the device is operating in power saving mode, the pattern chosen can be to save power by listening on the best link, but also receive a few beacon frames in the roam-impending link to provide fairness for roam decisions.

TABLE 1

| Band | beacon Rx Rate (Mbits/per second) | Beacon Size (in Bytes) | Time (Beacon size in bits/ Rate) | Current (in mA) | Draining of Battery current * Time (mAh) |
|---|---|---|---|---|---|
| 2G | 1 | 512 | 4 ms | $C_{2G}$ | $C_{2G}$ * 4 ms |
| 5G | 6 | 512 | .66 ms | $C_{5G}$ | $C5_G$ * .66 ms |
| 6G | 6 | 512 | .66 ms | $C_{6G}$ | $C6_G$ * .66 ms |

The last column of Table 1 is a parameter that represents the energy or charge drained from the battery due to the beacon listening interval on the link.

It should be noted that certain passages of this disclosure can reference terms such as "first" and "second" in connection with subsets of frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beamformers and/or beamformees) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C #, or in any byte code language such as JAVA. The software programs or executable instructions can be stored on or in one or more articles of manufacture as object code. Circuitry may refer to any electronic circuits or circuits. Although some of the examples above refer to MLO with two or three links, the disclosure is intended to cover MLO operations including two or more links including but not limited to MLO using one or more links are in the 2.4 GHz frequency band, one or more links are in 5 GHz frequency band, and/or one or more links are in the 6 GHz frequency band.

Circuitry or circuit may refer to any electronic circuit or combination of circuits. To the extent that a device, circuit, processor or circuitry is described or recited in a claims as performing one or more operations or functions or as configured to perform to one or more operations or functions, the performance of the recited function(s) or operation (s) can be distributed across two or more devices, circuits, or processors without departing from the scope of the claims unless those functions or operations are explicitly recited as being performed on a specific single circuit or set of circuits, processor, or device (e.g., using the phrase "on a single circuit", "on the set of circuits comprising" or "on a single device").

While the foregoing written description of the methods and systems enables one of ordinary skill to make and use embodiments thereof, those of ordinary skill will understand and appreciate the existence of variations, combinations, and equivalents of the specific embodiment, method, and examples herein. For example, specific values for bandwidths, channels and sub bands discussed above are exemplary. The present methods and systems should therefore not be limited by the above described embodiments, methods, and examples, but by all embodiments and methods within the scope and spirit of the disclosure.

What is claimed is:

1. A first device, comprising:

a circuit configured to provide frames across a connection comprised of one or more links to a second device, wherein the circuit is configured to use a beacon reception pattern where first intervals on a first link are alternately disposed with second intervals on a second link in a mutually exclusive manner.

2. The first device of claim 1, wherein the frames are provided according to an 802.11 protocol and the first intervals are for listening for a beacon frame.

3. The first device of claim 1, wherein the circuit is configured to select the beacon reception pattern for the first link, the second link, and a third link, the beacon reception pattern being chosen in response a low battery condition or a roam decision.

4. The first device of claim 1, wherein the circuit is configured to select the beacon reception pattern for the first link, the second link, and a third link, the beacon reception pattern being chosen in response a low battery condition and a roam decision.

5. The first device of claim 1, wherein the circuit is configured to use during a low battery condition a lower power consuming link of the first link and the second link for receiving a beacon frame.

6. The first device of claim 1, wherein the first device the second device are each one of mobile station devices or mobile access points.

7. The first device of claim 3, wherein the beacon reception pattern is selected using an energy or charge drain parameter for reception of a beacon.

8. The first device of claim 1, wherein at least one of the first link and the second link uses the 2.4 GHz frequency band, and another of the links uses the 5 GHZ frequency band or 6.0 GHZ frequency band.

9. A first device, comprising:

a circuit configured to provide multilink operations across a connection to a second device, wherein the circuit is configured to select a beacon reception pattern for a first link, a second link, and a third link, the beacon reception pattern being chosen in response a low battery condition, a delivery traffic indication map setting, or a roam decision, wherein the circuit is configured to use the beacon reception pattern where first intervals on the first link are alternately disposed with second intervals on the second link in a mutually exclusive manner.

10. The first device of claim 9 wherein the circuit is configured to select the beacon reception pattern for the first link, the second link, and the third link, the beacon reception pattern being chosen in response the low battery condition or the roam decision.

11. The first device of claim 9 wherein the circuit is configured to use during the low battery condition a lower power consuming link of the first link and the second link for receiving a beacon frame.

12. The first device of claim 9 wherein the first device the second device are each one of mobile station devices or mobile access points.

13. The first device of claim 9 wherein the beacon reception pattern is selected using an energy or charge drain parameter for reception of a beacon.

14. A first device, comprising:

a circuit configured to provide multilink operations across a connection to a second device, wherein the circuit is configured to use a beacon reception pattern in response to a low battery condition or delivery traffic indication map setting, wherein the beacon reception pattern has less first listen intervals per period on a first link than a number of second listen intervals on a second link, wherein the number is at least one, wherein the circuit is configured to use the beacon reception pattern where first intervals on the first link are alternately disposed with second intervals on the second link in a mutually exclusive manner.

15. The first device of claim 14, wherein the low battery condition is associated with a battery of the first device being below a first threshold and the first device being solely on battery power.

16. The first device of claim 14, the first device comprises a first oscillator for the first link and a second oscillator for the second link.

17. The first device of claim 16, wherein the first listen intervals on the first link are alternately disposed with the second listen intervals on the second link.

18. The first device of claim 17, wherein the circuit is configured to select the beacon reception pattern for the first link, the second link, and a third link, the beacon reception pattern being chosen in response to the low battery condition or a roam decision.

19. The first device of claim 14, wherein the beacon reception pattern is selected in response to a reception level on the first link.

* * * * *